United States Patent
Park et al.

(10) Patent No.: US 10,375,000 B2
(45) Date of Patent: *Aug. 6, 2019

(54) TERMINAL DEVICE, SERVER, AND METHOD OF PROVIDING MESSAGING SERVICE

(71) Applicant: Samsung Electronics Co., Ltd., Suwon-si, Gyeonggi-do (KR)

(72) Inventors: Yong Seok Park, Yongin-si (KR); Hyo Jin Jung, Yongin-si (KR); Jae Young Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/722,570

(22) Filed: Oct. 2, 2017

(65) Prior Publication Data

US 2018/0026928 A1 Jan. 25, 2018

Related U.S. Application Data

(63) Continuation of application No. 14/632,099, filed on Feb. 26, 2015, now Pat. No. 9,781,066.

(30) Foreign Application Priority Data

Mar. 6, 2014 (KR) .......................... 10-2014-0026324

(51) Int. Cl.
*H04L 12/58* (2006.01)
*H04L 12/18* (2006.01)
(Continued)

(52) U.S. Cl.
CPC ........... *H04L 51/18* (2013.01); *G06Q 10/107* (2013.01); *H04L 12/185* (2013.01); *H04L 51/04* (2013.01); *H04W 4/14* (2013.01)

(58) Field of Classification Search
CPC ..... G06Q 10/107; H04L 12/185; H04L 41/04; H04L 41/18; H04W 4/14
(Continued)

(56) References Cited

U.S. PATENT DOCUMENTS 8,388,440 B2 * 3/2013 Patterson ................ A63F 13/12
463/29
8,832,189 B2 * 9/2014 Kowalewski ....... H04L 12/1827
709/204
(Continued)

FOREIGN PATENT DOCUMENTS

EP 2 537 568 A1 12/2012
EP 1 982 464 B1 10/2013
(Continued)

*Primary Examiner* — Alina A Boutah
(74) *Attorney, Agent, or Firm* — Jefferson IP Law, LLP

(57) ABSTRACT

A terminal device is provided. The terminal device includes an input unit configured to receive an input of a user command inviting a non-subscriber of a messaging service to join a messaging group, and a communication unit configured to transmit a request for invitation information to a server, when the invitation information is received from the server, to transmit an invitation message including the invitation information and an application installation Uniform Resource Locator (URL) to a non-subscriber terminal, and when a join result of the non-subscriber joining the messaging service is received, to transmit a request for an invitation of the non-subscriber to the messaging group.

20 Claims, 8 Drawing Sheets

(51) Int. Cl.
*H04W 4/14* (2009.01)
*G06Q 10/10* (2012.01)

(58) Field of Classification Search
USPC .................................................. 709/206, 207
See application file for complete search history.

(56) References Cited

U.S. PATENT DOCUMENTS

| | | | | |
|---|---|---|---|---|
| 8,838,836 | B1* | 9/2014 | Li | H04L 67/104 709/204 |
| 2002/0086732 | A1* | 7/2002 | Kirmse | A63F 13/12 463/42 |
| 2003/0177184 | A1* | 9/2003 | Dickerman | H04L 51/04 709/204 |
| 2006/0184997 | A1* | 8/2006 | La Rotonda | G06Q 10/10 726/2 |
| 2007/0019616 | A1* | 1/2007 | Rantapuska | H04L 12/1822 370/352 |
| 2007/0198647 | A1* | 8/2007 | Lingafelt | H04L 12/1822 709/207 |
| 2008/0095183 | A1* | 4/2008 | Bijwaard | H04L 12/185 370/432 |
| 2008/0132215 | A1* | 6/2008 | Soderstrom | H04L 12/1818 455/416 |
| 2009/0158041 | A1* | 6/2009 | Kang | H04L 63/104 713/171 |
| 2009/0181767 | A1* | 7/2009 | Feng | A63F 13/12 463/29 |
| 2009/0215476 | A1* | 8/2009 | Tysowski | H04L 51/04 455/466 |
| 2010/0299276 | A1* | 11/2010 | Shahine | G06Q 10/10 705/319 |
| 2010/0319062 | A1* | 12/2010 | Danieli | H04L 12/1818 726/7 |
| 2011/0307496 | A1* | 12/2011 | Jones | G06F 17/30386 707/748 |
| 2013/0094642 | A1* | 4/2013 | Sverdlov | H04M 3/565 379/201.03 |
| 2014/0006517 | A1* | 1/2014 | Hsiao | G06Q 50/01 709/205 |
| 2014/0019582 | A1* | 1/2014 | Kim | H04L 51/32 709/217 |
| 2014/0023183 | A1* | 1/2014 | Brown | H04L 51/36 379/93.17 |
| 2014/0067980 | A1* | 3/2014 | La Rotonda | G06Q 10/10 709/206 |
| 2014/0250145 | A1* | 9/2014 | Jones | G06Q 10/101 707/769 |
| 2014/0266573 | A1* | 9/2014 | Sullivan | G07C 9/00571 340/4.32 |
| 2015/0067044 | A1* | 3/2015 | Bakaev | H04L 65/403 709/204 |
| 2015/0222580 | A1* | 8/2015 | Grue | H04L 51/08 709/206 |

FOREIGN PATENT DOCUMENTS

| | | |
|---|---|---|
| KR | 10-2006-0084932 A | 7/2006 |
| KR | 10-2012-0087231 A | 8/2012 |

* cited by examiner

TERMINAL DEVICE, SERVER, AND METHOD OF PROVIDING MESSAGING SERVICE

CROSS-REFERENCE TO RELATED APPLICATION(S)

This application is a continuation application of prior application Ser. No. 14/632,099, filed on Feb. 26, 2015, which has issued as U.S. Pat. No. 9,781,066 on Oct. 3, 2017 and claimed the benefit under 35 U.S.C. § 119(a) of a Korean patent application filed on Mar. 6, 2014 in the Korean Intellectual Property Office and assigned Serial number 10-2014-0026324, the entire disclosure of which is hereby incorporated by reference.

TECHNICAL FIELD

The present disclosure relates to a terminal device, a server, and a method of providing a messaging service in which a user may be invited to join a messaging group.

BACKGROUND

With recent developments in electronic technology and communication networks, various apparatuses and methods for communication between users have been developed. Thus, users may communicate with other users through various methods, such as electronic mail, wireless telephones, instant messaging, internet chatting, video calls, and the like as well as wired telephones.

In particular, instant messaging service is widely used because it enables users to send messages whenever the users want without limitations in terms of time and place and to freely communicate with other users.

The above-described instant messaging service allows users who have joined the messaging service to form a messaging group, to communicate with other users in the messaging group, and to send/receive various data, such as photographs, moving pictures, documents, and the like.

However, since the messaging service provides such a service on the premise that a user has joined the messaging service, a user who has not joined the service may not use the messaging service. Therefore, there is no way for the user who has joined the messaging service to invite a user who has not joined the messaging service.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a terminal device, a server, and a method of providing a messaging service by which a user who does not join a messaging service may be allowed to join the messaging service and automatically invited to the messaging service.

In accordance with an aspect of the present disclosure, a terminal device is provided. The terminal device includes an input unit configured to receive an input of a user command inviting a non-subscriber of a messaging service to join a messaging group, and a communication unit configured to transmit a request for invitation information to a server, when the invitation information is received from the server, to transmit an invitation message including the invitation information and an application installation Uniform Resource Locator (URL) to a non-subscriber terminal, and when a join result of the non-subscriber joining the messaging service is received, to transmit a request for an invitation of the non-subscriber to the messaging group.

In accordance with another aspect of the present disclosure, a server is provided. The server includes an invitation information creating unit configured to create invitation information when invitation information is requested from an inviter terminal, a communication unit configured to transmit the created invitation information to the inviter terminal and to transmit a join result of a non-subscriber joining a messaging service to the inviter terminal, a membership managing unit configured to, when a join request including the invitation information and non-subscriber information is received from a non-subscriber terminal device, let the non-subscriber join the messaging group, and a group managing unit configured to, when a request inviting the non-subscriber to the messaging group is received from the inviter terminal, add the non-subscriber to join a messaging group.

In accordance with another aspect of the present disclosure, a method of providing, by a terminal device, a messaging service is provided. The method includes receiving, by the terminal device, an input of a user command inviting a non-subscriber of the messaging service to join a messaging group, transmitting a request for invitation information to a server, when the invitation information is received from the server, transmitting an invitation message including the invitation information and an application installation URL to a non-subscriber terminal, and when a join result of the non-subscriber joining the messaging service is received from the server, transmitting a request for an invitation of the non-subscriber to the messaging group.

In accordance with another aspect of the present disclosure, a method of providing, by a server, a messaging service is provided. The method includes creating invitation information when invitation information is requested from an inviter terminal, transmitting the created invitation information to the inviter terminal, when a join request including the invitation information and non-subscriber information is received from a non-subscriber terminal, letting the non-subscriber join the messaging service, transmitting a join result of the non-subscriber joining the messaging service to the inviter terminal, and when a request inviting the non-subscriber to join a messaging group is received from the inviter terminal, adding the non-subscriber to the messaging group.

In accordance with another aspect of the present disclosure, a method of providing, by a messaging system, a messaging service is provided. The method includes when a user command by which an inviter terminal invites a non-subscriber of the messaging service to join a messaging group is inputted, transmitting a request for invitation information to a server, creating, by the server, invitation information and transmitting the created invitation information to the inviter terminal, transmitting, by the inviter terminal, an invitation message including the invitation information and an application installation URL to a non-subscriber terminal, transmitting, by the non-subscriber terminal, a join request including the invitation information and non-subscriber information through the URL, letting, by the server, the non-subscriber join the messaging service and transmitting a join result to the inviter terminal, requesting, by the inviter terminal, an invitation of the non-subscriber to the messaging group, and adding, by the server, the non-subscriber to the messaging group.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
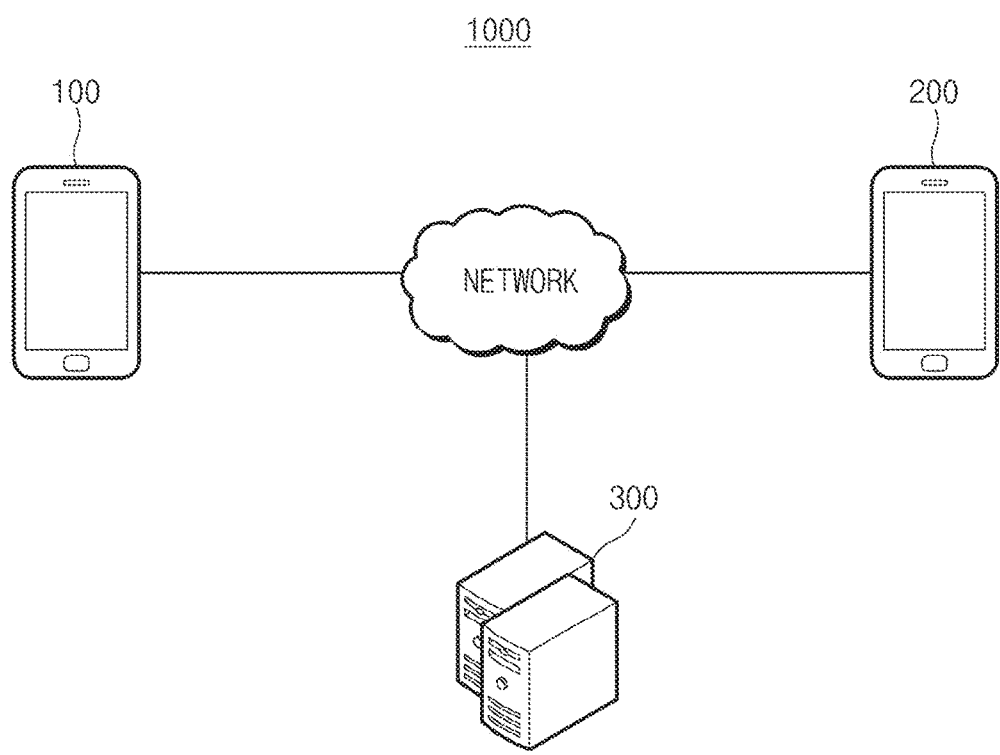
FIG. 1 is a block diagram showing a configuration of a messaging system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications, of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expression "include" or "may include" that may be used in describing the various embodiments of the present disclosure indicates the presence of a disclosed corresponding function, operation or component but does not exclude one or more functions, operations or components in addition. Furthermore, in describing the various embodiments of the present disclosure, it should be understood that the term "includes" or "has" indicates the presence of characteristics, numbers, steps, operations, components, parts or combinations thereof represented in the present disclosure but does not exclude the presence or addition of one or more other characteristics, numbers, steps, operations, components, parts or combinations thereof.

The expression "or" in the various embodiments of the present disclosure includes any and all combinations of enumerated words. For example, the expression "A or B" may include A, B, or both A and B.

The expression "a first", "a second", "firstly", or "secondly" in the various embodiments of the present disclosure may modify various components of the various embodiments but does not limit corresponding components. For example, the expressions above do not limit the order and/or importance of corresponding components. The expressions above may be used to distinguish one component from another component. For example, both a first user device and a second user device are user devices that are mutually different user devices. For example, without departing from the scope of rights of the various embodiments of the present disclosure, a first component may be called a second component and similarly, the second component may also be called the first component.

When any component is referred to as being "connected" or "accessed" to another component, it should be understood that the former can be "directly connected" to the latter, or there may be another component in between. On the contrary, when any component is referred to as being "directly connected" or "directly accessed" to another component, it should be understood that there may be no other component in between.

The terms used in describing the various embodiments of the present disclosure are used only to describe specific various embodiments and are not intended to limit the present disclosure. The terms in singular form may include the plural forms unless otherwise specified.

Unless otherwise defined herein, all terms used herein including technical or scientific terms have the same meanings as those generally understood by a person skilled in the art.

Terms defined in generally used dictionaries should be construed to have meanings matching contextual meanings in the related art and should not be construed as having an ideal or excessively formal meaning unless otherwise defined herein.

An electronic device (e.g., terminal device or server) according to various embodiments of the present disclosure may be a device that includes a communication function. For example, the electronic device may include at least one of a smart phone, a tablet Personal Computer (PC), a mobile phone, a video phone, an e-book reader, a desktop PC, a laptop PC, a net book computer, a Personal Digital Assistant (PDA), a Portable Multimedia Player (PMP), an MP3 player, a mobile medical device, a camera, and a wearable device (e.g., a Head-Mounted-Device (HMD) such as electronic glasses, electronic clothing, an electronic bracelet, an electronic necklace, an electronic accessory, an electronic tattoo, or a smart watch).

According to various embodiments, the electronic device may be a smart home appliance having a communication function. The smart home appliance may include, for example, at least one of a Television (TV) set, a Digital Video Disk (DVD) player, an audio set, a refrigerator, an air conditioner, a cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic frame.

According to various embodiments, the electronic device may include at least one of various medical devices (e.g., a Magnetic Resonance Angiography (MRA) device, a Magnetic Resonance Imaging (MRI) device, a Computed Tomography (CT) device, a camera, and an ultrasonicator), a navigation device, a Global Positioning System (GPS) receiver, an Event Data Recorder (EDR), a Flight Data Recorder (FDR), a car infotainment device, electronic equipment for a ship (e.g., a navigation device for a ship or a gyro compass), avionics, a security device, a head unit for a car, an industrial or home robot, a financial institution's Automated Teller's Machine (ATM) or a store's point of sale (POS) system.

According to various embodiments, the electronic device may include at least one of a portion of a building/structure or furniture including a communication function, an electronic board, an electronic signature receiving device, a projector, and various measurement devices (e.g., water, electricity, gas and electric wave measurement devices). An electronic device according to various embodiments of the present disclosure may be one or more combinations of the above-described various devices. Moreover, an electronic device according to various embodiments of the present disclosure may be a flexible device. Moreover, it is obvious to a person skilled in the art that an electronic device according to various embodiments of the present disclosure is not limited to the above-described devices.

Electronic devices according to various embodiments are described below with reference to the accompanying drawings. The term "user" used in various embodiments may refer to a person who uses an electronic device, or a device (e.g., an electronic device having artificial intelligence) that uses an electronic device.

FIGS. 1 through 8, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1 is a block diagram showing a configuration of a messaging system according to an embodiment of the present disclosure.

Referring to FIG. 1, a messaging system 1000, which may include an inviter terminal device (or first terminal device) 100, a non-subscriber terminal device (or second terminal device) 200, and a server 300, is illustrated.

According to an embodiment, the inviter terminal device 100, the non-subscriber terminal device 200, and the server 300 may be connected to one another through a network. For example, the inviter terminal device 100, the non-subscriber terminal device 200, and the server 300 may be connected to one another through a wired/wireless internet network that uses a Transmission Control Protocol/Internet Protocol (TCP/IP) to link devices worldwide. In another example, the inviter terminal device 100, the non-subscriber terminal device 200, and the server 300 may be connected to one another through a mobile communication network, such as Code Division Multiple Access (CDMA) network, a Wideband Code Division Multiple Access (WCDMA) network, a Long Term Evolution (LTE) network, or the like.

The inviter terminal device 100 may correspond to a terminal device of a first user who has joined a messaging service and uses the messaging service. The non-subscriber terminal device 200 may correspond to a terminal device of a second user who does not join the messaging service. According to an embodiment of the present disclosure, the first user may invite a user who does not join the messaging service.

The inviter terminal device 100 may receive an input of a user command inviting a non-subscriber of the messaging service from a user thereof. According to an embodiment, the inviter terminal device 100 displays a list including subscribers and non-subscribers of the messaging service. The user may select at least one of the non-subscribers included in the list.

According to an embodiment, when a user command inviting a non-subscriber of the messaging service to the messaging group is inputted, the inviter terminal device 100 may transmit a request for invitation information to the server 300. According to an embodiment, the inviter terminal device 100 may transmit inviter information and non-subscriber information together when requesting the invitation information. For example, the inviter information may be an inviter's messaging service ID or Mobile Station Internal ISDN number (MSISDN), and the non-subscriber information may be MSISDN. According to an embodiment, when invitation information (e.g., a token corresponding to inherent identification information that may be connected to a chatting room (or messaging group) designated by the inviter terminal device 100) is received from the server 300, the inviter terminal device 100 may transmit an invitation message to the non-subscriber terminal device 200. According to an embodiment, the invitation message may include invitation information and an application installation Uniform Resource Locator (URL). The inviter terminal device 100 may store the application installation URL in advance, or may receive the application installation URL together with the invitation information from the server 300. According to an embodiment, the inviter terminal device 100 may transmit the invitation message by using a messaging service different from the messaging service according to an embodiment of the present disclosure. For example, the inviter terminal device 100 may transmit an invitation message to the non-subscriber terminal device 200 by using a Short Message Service (SMS).

According to an embodiment, when a join result of the non-subscriber for the messaging service is received from the server 300, the inviter terminal device 100 may transmit a request for an invitation of the non-subscriber to the messaging group to the server 300. According to an embodiment, the inviter terminal device 100 may request the invitation of the non-subscriber by using the messaging group information and a messaging service ID or MSISDN of the non-subscriber. The messaging group information indicates information capable of identifying a specific messaging group.

As described above, the inviter terminal device 100 may transmit invitation information related to joining of a specific messaging service based on communication connection information (e.g., phone number of the non-subscriber terminal device 200, E-mail information of the non-subscriber terminal device 200, etc.) related to at least one stored non-subscriber terminal device 200. According to an embodiment, the invitation terminal device 100 may classify the communication connection information into communication connection information of specific messaging service subscribers and communication connection information of non-subscribers based on a list of subscribers provided by the specific messaging service. The inviter terminal device 100 may provide the communication connection information through an execution screen of the specific messaging service or a separate non-subscriber search screen. Alternatively, according to an embodiment, the inviter terminal device 100 may output a list related to the communication connection information of non-subscribers in a specific chatting room provided by the specific messaging service. In relation to this, the inviter terminal device 100 may provide a menu or icon capable of outputting a list including items related to the communication connection information of non-subscribers.

When at least one of the communication connection information is related to the specific messaging service non-subscribers, the inviter terminal device 100 may transmit the selected communication connection information and the inviter information to the server 300. When an invitation message created based on the communication connection information and the inviter information is received, the inviter terminal device 100 may transmit the invitation message to the non-subscriber terminal device 200. Herein, when a plurality of non-subscribers communication connection information is selected from the list, the inviter terminal device 100 may transmit an invitation message related to joining of the specific messaging service or requesting a participation in the chatting room for the specific messaging service to the respective non-subscriber terminal devices 200.

When the invitation message is received from the inviter terminal device 100, the non-subscriber terminal device 200 may send the server 300 a request for joining the messaging service. According to an embodiment, the non-subscriber terminal device 200 may display the invitation message on a screen thereof. The invitation message displayed on the screen may include an invitation phrase (e.g., "Your friend invites you to the messaging service"), and an application installation URL (including a token connectable to a specific messaging service-related chatting room (or messaging group) opened or maintained by the inviter terminal device 100). According to an embodiment, the non-subscriber terminal device 200 may receive an input of a user command for selecting a URL from a user. When the user command for selecting a URL is inputted, the non-subscriber terminal device 200 may access to the selected URL to install an application providing the messaging service. When the application is installed, the non-subscriber terminal device 200 may transmit the server 300 a request for joining the messaging service according to the user command. According to an embodiment, the join request may include invitation information and non-subscriber information. According to an embodiment, in a case where an application is installed in the non-subscriber terminal device 200, a process of installing the application may be omitted. In the course of executing the messaging application, a token value (or invitation information) extracted from the invitation message may be transferred to the messaging application in the form of a parameter. After the installation of the messaging application and the join process are completed, the messaging application transfers the token transferred in the course of execution thereof and inherent information of the non-subscriber terminal device 200 to the server 300 to perform authentication, and when the authentication is completed, the messaging application may send the authenticated information to the inviter terminal device 100. In response to this, the inviter terminal device 100 may confirm that the invitation message has been sent based on the received subscriber information, and may invite the corresponding subscriber to a group room for participation.

When invitation information is requested from the inviter terminal device 100, the server 300 may create the invitation information. The invitation information may include inherent identification information by which it may be identified that an inviter has invited a non-subscriber to the messaging group. Whenever the invitation information is requested, the server 300 may create inherent invitation information (for each chatting room or for each non-subscriber). According to an embodiment, the server 300 may store the invitation information in combination with subscriber information and non-subscriber information received from the inviter terminal device 100. According to an embodiment, the server 300 may store invitation information, subscriber information, non-subscriber information and messaging group information in relation to one another.

According to an embodiment, when invitation information is created, the server 300 may transmit the created invitation information to the inviter terminal device 100. According to an embodiment, the server 300 may transmit an application installation URL together with the invitation information.

When a join request is received from the non-subscriber terminal device 200, the server 300 may let the non-subscriber join the messaging service. According to an embodiment, when the non-subscriber joins the messaging service, the server 300 may store a messaging service ID of the non-subscriber.

When the non-subscriber joins the messaging service, the server 300 may transmit a join result to the inviter terminal device 100. According to an embodiment, the server 300 may identify the inviter by using the invitation information received together with the join request from the non-subscriber terminal device 200, and may transmit the join result to the identified inviter. According to an embodiment, when transmitting the join result, the server 300 may transmit the messaging service ID given according to the joining of the non-subscriber.

When a request inviting the non-subscriber to the messaging is received from the inviter terminal device 100, the server 300 may add the non-subscriber to the messaging group.

The above embodiment describes that when a non-subscriber joins the messaging service, the server 300 transmits a join result to the inviter terminal device 100. However, according to an embodiment, in a case where the server 300 stores the invitation information, the subscriber information, the non-subscriber information and the messaging group information in relation to one another, the server 300 may not transmit the join result to the inviter terminal device 100. According to an embodiment, in a case where the server 300 stores the invitation information, the subscriber information, the non-subscriber information and the messaging group information in relation to one another, when a non-subscriber joins the messaging service, the server 300 may add the non-subscriber to the messaging group using the invitation information, the subscriber information, the non-subscriber information and the messaging group information.

Figure 2:
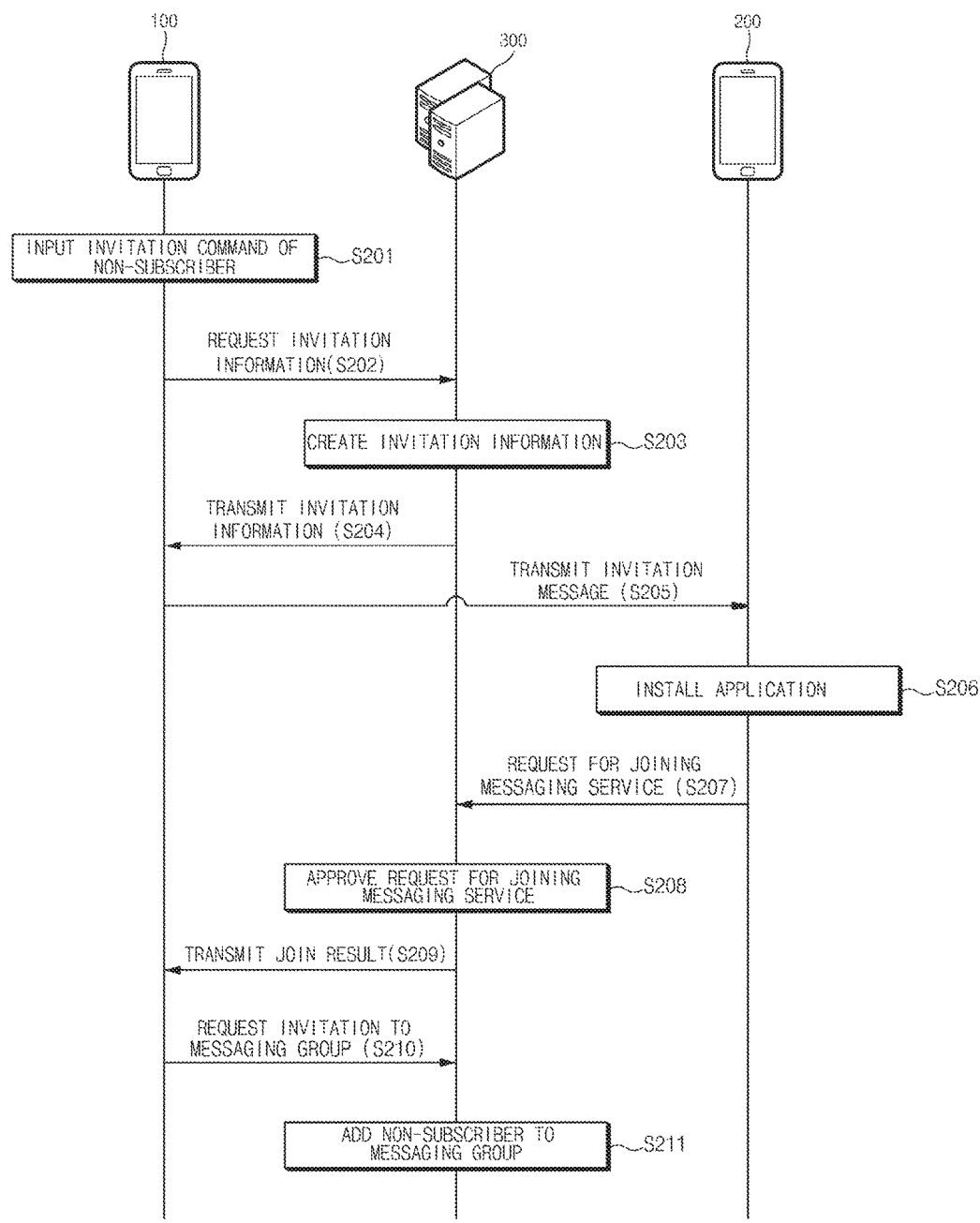
FIG. 2 is a flowchart showing a method of providing a messaging service in a messaging system according to an embodiment of the present disclosure.

FIG. 2 is a flowchart showing a method of providing a messaging service in a messaging system according to an embodiment of the present disclosure.

Referring to FIG. 2, the inviter terminal device 100, which may receive an invitation command of a non-subscriber from a user thereof at operation S201, is illustrated. According to an embodiment, the inviter terminal device 100 may display a list including subscribers and non-subscribers of the messaging service. The user may invite the non-subscriber to the messaging group by selecting at least one of the non-subscribers included in the list. In relation to this, the inviter terminal device 100 may output the list related to the communication connection information of the non-subscriber of the specific messaging service on an execution screen of the specific messaging service or a screen of a chatting room executed in the specific messaging service. The inviter terminal device 100 may provide a menu or icon related to the output of the list. When the menu or icon is selected, the inviter terminal device 100 may compare the stored communication connection information with communication connection information joining the specific messaging service to extract the information of the non-subscriber terminal devices 200 which do not join the specific messaging service. The inviter terminal device 100 may configure the list based on the extracted information of the non-subscriber terminal devices 200.

When an invitation command of a non-subscriber is inputted, the inviter terminal device 100 may transmit a request for invitation information to the server 300 at operation S202. According to an embodiment, the inviter terminal device 100 may transmit inviter information and non-subscriber information together when requesting the invitation information. For example, the inviter information may be an inviter's messaging service ID or MSISDN, and the non-subscriber information may be MSISDN.

When the invitation information is requested from the inviter terminal device 100, the server 300 may create the invitation information at operation S203. The invitation information indicates inherent identification information (e.g., Token) capable of identifying that the inviter has invited the non-subscriber to the specific messaging group. Whenever the invitation information is requested, the server 300 may create inherent invitation information. According to an embodiment, the server 300 may store the invitation information in relation to the subscriber information and non-subscriber information received from the inviter terminal device 100. According to an embodiment, the server 300 may store invitation information, subscriber information, non-subscriber information and messaging group information in relation to one another.

When the invitation information is created, the server 300 may transmit the created invitation information to the inviter terminal device 100 at operation S204. According to an embodiment, the server 300 may transmit an application installation URL together with the invitation information.

When invitation information is received from the server 300, the inviter terminal device 100 may transmit an invitation message to the non-subscriber terminal device 200 at operation S205. According to an embodiment, the invitation message may include invitation information and an application installation URL. The inviter terminal device 100 may store the application installation URL in advance, or may receive the application installation URL together with the invitation information from the server 300. According to an embodiment, the inviter terminal device 100 may transmit the invitation message by using a messaging service different from the messaging service according to an embodiment of the present disclosure. For example, the inviter terminal device 100 may transmit an invitation message to the non-subscriber terminal device 200 by using a SMS.

When the invitation message is received from the inviter terminal device 100, the non-subscriber terminal device 200 may install an application providing the messaging service at operation S206. According to an embodiment, the non-subscriber terminal device 200 may display the invitation message on a screen thereof. The invitation message displayed on the screen may include an invitation phrase (e.g., "Your friend invites you to the messaging service"), and an application installation URL. According to an embodiment, the non-subscriber terminal device 200 may receive an input of a user command for selecting a URL from a user thereof. When the user command for selecting a URL is inputted, the non-subscriber terminal device 200 may access to the selected URL to install an application providing the messaging service.

According to an embodiment, when the application has been installed in the non-subscriber terminal device 200, the installation operation of the application may be omitted.

When the application is installed, the non-subscriber terminal device 200 may send the server 300 a request for joining the messaging service at operation S207. According to an embodiment, the join request may include invitation information and non-subscriber information.

When the request for joining the messaging service (i.e., a join request) is received from the non-subscriber terminal device 200, the server 300 may approve the join request at operation S208. According to an embodiment, when the non-subscriber joins the messaging service, the server 300 may store the messaging service ID of the non-subscriber.

When the non-subscriber joins the messaging service, the server 300 may transmit a join result to the inviter terminal device 100 at operation S209. According to an embodiment, the server 300 may identify the inviter by using the invitation information received together with the join request from the non-subscriber terminal device 200, and may transmit the join result to the identified inviter. According to an embodiment, when transmitting the join result, the server 300 may transmit the messaging service ID of the non-subscriber together.

When the messaging service join result of the non-subscriber is received from the server 300, the inviter terminal device 100 may transmit a request for an invitation of the non-subscriber to the messaging group to the server 300 at operation S210. According to an embodiment, the inviter terminal device 100 may request the invitation of the non-subscriber by using the messaging group information and a messaging service ID or MSISDN of the non-subscriber.

When the request inviting the non-subscriber to the messaging group is received from the inviter terminal device 100, the server 300 may add the non-subscriber to the messaging group at operation S211.

The above embodiment describes that when a non-subscriber joins the messaging service, the server 300 transmits a join result to the inviter terminal device 100. However, according to an embodiment, in a case where the server 300 stores the invitation information, the subscriber information, the non-subscriber information and the messaging group information in relation to one another, the server 300 may not transmit the join result to the inviter terminal device 100. According to an embodiment, in a case where the server 300 stores the invitation information, the subscriber information, the non-subscriber information and the messaging group information in relation to one another, when a non-subscriber joins the messaging service, the server 300 may add the non-subscriber to the messaging group using the invitation information, the subscriber information, the non-subscriber information and the messaging group information.

A method of providing a messaging service at a messaging system according to various embodiments of the present disclosure may include: when a user command inviting a non-subscriber of the messaging service to join a messaging group is inputted, requesting, by an inviter terminal, invitation information to a server, creating, by the server, invitation information and transmitting the created invitation information to the inviter terminal, transmitting, by the inviter terminal, an invitation message including the invitation information and an application installation URL to a non-subscriber terminal device, transmitting, by the non-subscriber terminal device, a join request including the invitation information and non-subscriber information through the URL, letting, by the server, the non-subscriber join the messaging service and transmitting a join result to the inviter terminal, requesting, by the inviter terminal, an invitation of the non-subscriber to the messaging group to the server, and adding, by the server, the non-subscriber to the messaging group.

Figure 3:
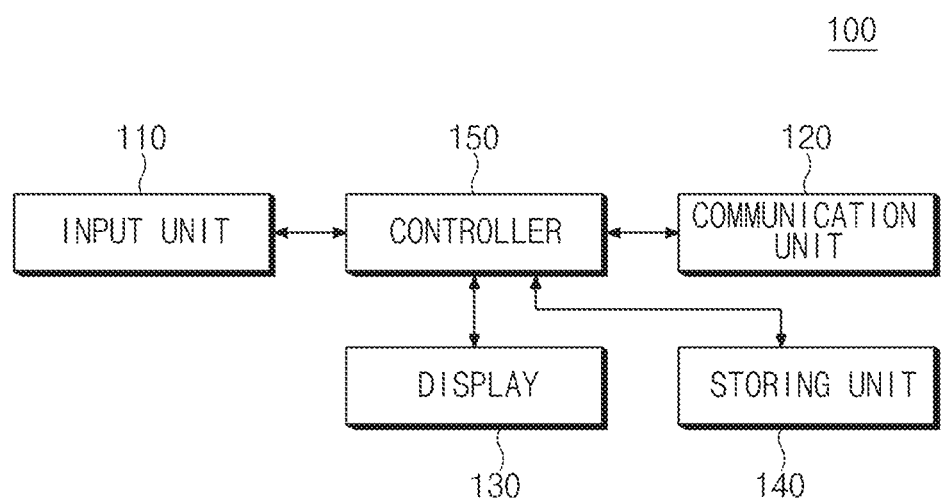
FIG. 3 is a block diagram showing a configuration of an inviter terminal device according to an embodiment of the present disclosure.

FIG. 3 is a block diagram showing a configuration of an inviter terminal apparatus according to an embodiment of the present disclosure.

Referring to FIG. 3, an inviter terminal device 100, which may include an input unit 110, a communication unit 120, a display 130, a storing unit 140, and a controller 150, is illustrated.

The input unit 110 may receive an input of a user command. According to an embodiment, the input unit 110 may receive an input of a user command inviting a non-subscriber of the messaging service from a user.

According to an embodiment, the input unit 110 may be implemented by a touch screen or touch pad operated by a user's touch input.

The communication unit 120 may communicate with the non-subscriber terminal device 200 or the server 300. According to an embodiment, when a user command inviting a non-subscriber of the messaging service to the messaging group is inputted, the communication unit 120 may transmit a request for invitation information to the server 300. According to an embodiment, the communication unit 120 may transmit inviter information and non-subscriber information together when requesting the invitation information. For example, the inviter information may be an inviter's messaging service ID or MSISDN, and the non-subscriber information may be MSISDN.

According to an embodiment, when the invitation information is received from the server 300, the communication unit 120 may transmit an invitation message to the non-subscriber terminal device 200. According to an embodiment, the invitation message may include invitation information and an application installation URL. According to an embodiment, the communication unit 120 may transmit the invitation message by using a messaging service different from the messaging service according to an embodiment of the present disclosure. For example, the communication unit 120 may transmit an invitation message to the non-subscriber terminal device 200 by using SMS.

According to an embodiment, when a join result of a non-subscriber for the messaging service is received from the server 300, the communication unit 120 may transmit a request for an invitation of the non-subscriber to the messaging group to the server 300. According to an embodiment, the inviter terminal device 100 may request the invitation of the non-subscriber by using the messaging group information and a messaging service ID or MSISDN of the non-subscriber.

The display 130 may display a list including subscribers and non-subscribers of the messaging service according to a user command. The user may invite the non-subscriber to the messaging group by selecting at least one of the non-subscribers included in the list.

The storing unit 140 may store inviter information or non-subscriber information. For example, the storing unit 140 may store communication connection information related to at least one terminal device. Herein, the communication connection information may be stored to be classified into terminals devices which have joined a specific messaging service and terminals devices which do not join the specific messaging service. According to an embodiment, the storing unit 140 may store an application installation URL.

The controller 150 may control overall operations of the inviter terminal device 100. According to an embodiment, the controller 150 may control each of the input unit 110, the communication unit 120, the display 130 and the storing unit 140 such that the inviter terminal device 100 invites a non-subscriber of the messaging service and adds the non-subscriber to the messaging group.

The inviter terminal device 100 according to various embodiments of the present disclosure may include an input unit 110 configured to receive an input of a user command inviting a non-subscriber of a messaging service to join a messaging group, and a communication unit 120 configured to transmit a request for invitation information to a server 300, when invitation information is received from the server 300, transmitting an invitation message including the invitation information and an application installation URL to a non-subscriber terminal device 200, and when a result of the non-subscriber joining the messaging service is received, transmitting a request for an invitation of the non-subscriber to the messaging group.

Figure 4:
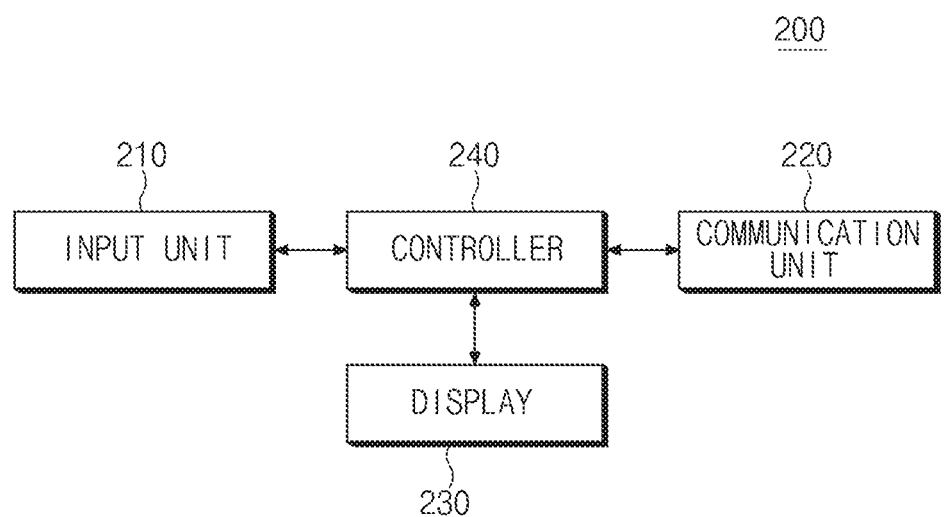
FIG. 4 is a block diagram showing a configuration of a non-subscriber terminal device according to an embodiment of the present disclosure.

FIG. 4 is a block diagram showing a configuration of a non-subscriber terminal device according to an embodiment of the present disclosure.

Referring to FIG. 4, a non-subscriber terminal device 200, which may include an input unit 210, a communication unit 220, and a controller 240, is illustrated.

The input unit 210 may receive an input of a user command. According to an embodiment, the input unit 210 may receive an input of a user command for selecting an application installation URL. For example, a user may input a user command selecting an application installation URL displayed on a display 230.

According to an embodiment, the input unit 210 may be implemented by a touch screen or touch pad operated by a user's touch input.

The communication unit 220 may communicate with the inviter terminal device 100 or the server 300. According to an embodiment, the communication unit 220 may receive an invitation message from the inviter terminal device 100.

The display 230 may display the invitation message received from the inviter terminal device 100. According to an embodiment, the display 230 may display the application installation URL included in the invitation message.

The controller 240 may control overall operations of the non-subscriber terminal device 200. According to an embodiment, the controller 240 may control each of the input unit 210, the communication unit 220, and the display 230 such that the non-subscriber terminal device 200 joins the messaging service or the messaging group.

Figure 5:
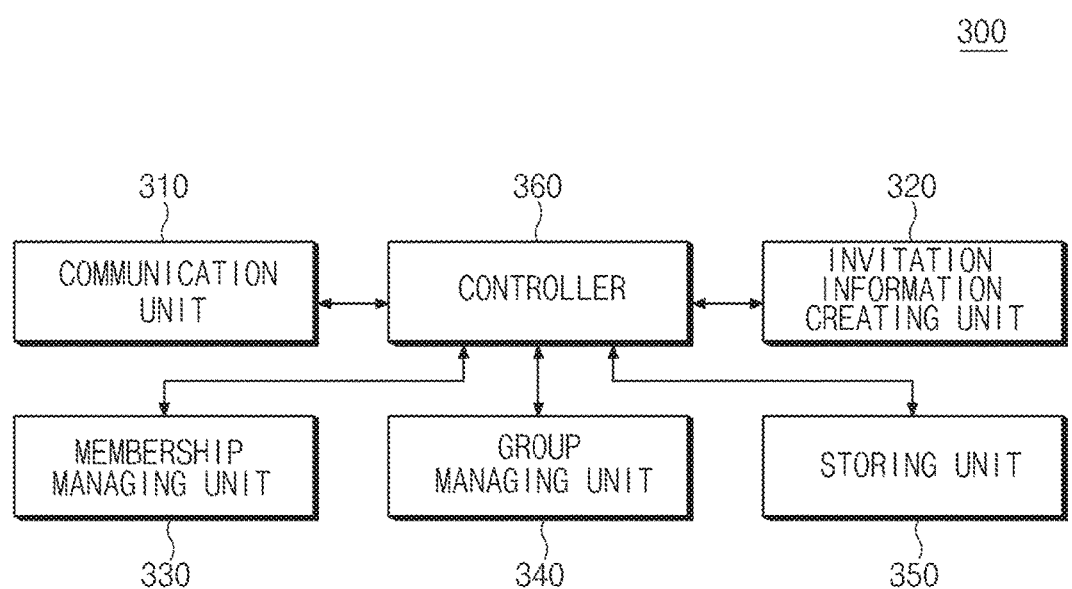
FIG. 5 is a block diagram showing a configuration of a server according to an embodiment of the present disclosure.

FIG. 5 is a block diagram showing a configuration of a server according to an embodiment of the present disclosure.

Referring to FIG. 5, a server 300, which may include a communication unit 310, an invitation information creating unit 320, a membership managing unit 330, a group managing unit 340, a storing unit 350, and a controller 360, is illustrated.

The communication unit 310 may communicate with the terminal device 100 and the server 300. According to an embodiment, the communication unit 310 may transmit invitation information to the inviter terminal device 100. According to an embodiment, the communication unit 310 may transmit an application installation URL together with the invitation information.

When the non-subscriber joins the messaging service, the communication unit 310 may transmit a join result to the inviter terminal device 100. According to an embodiment, when transmitting the join result, the communication unit 310 may transmit a messaging service ID of the non-subscriber, which is given by the joining of the non-subscriber, together.

According to an embodiment, in a case where the storing unit 350 stores the invitation information, the subscriber information, the non-subscriber information, and the messaging group information in relation to one another, the communication unit 310 may not transmit the join result to the inviter terminal device 100.

The invitation information creating unit 320 may create invitation information. According to an embodiment, when invitation information is requested from the inviter terminal device 100, the invitation information creating unit 320 may create invitation information. The invitation information may include inherent identification information by which it may be identified that an inviter has invited a non-subscriber to the messaging group. Whenever the invitation information is requested, the invitation information creating unit 320 may create inherent invitation information.

The membership managing unit 330 may manage messaging service subscribers. According to an embodiment, the membership managing unit 330 may manage messaging service subscribers by using messaging service subscriber information (e.g., ID or MSISDN) stored in the storing unit 350. According to an embodiment, when a join request is received from the non-subscriber terminal device 200, the membership managing unit 330 may let the non-subscriber join the messaging service through an authentication process.

The group managing unit 340 may manage a messaging group. The messaging group indicates a single group in which a plurality of users send or receive contents. According to an embodiment, the group managing unit 340 may manage a messaging group by using messaging group information stored in the storing unit 350. For example, when a new user is added to join a messaging group or a subscriber withdraws from the messaging group, it is possible to update the participants in the messaging group. In another example, when a participant included in the messaging group inputs a message, the group managing unit 340 may identify another participant such that the input message may be transmitted to the identified another participant.

According to an embodiment, when a request inviting a non-subscriber to join a messaging group is received from the inviter terminal device 100, the group managing unit 340 may add the non-subscriber to the messaging group. According to an embodiment, in a case where the storing unit 350 stores the invitation information, the subscriber information, the non-subscriber information and the messaging group information in relation to one another, when a non-subscriber joins the messaging service, the group managing unit 340 may add the non-subscriber to the messaging group using the invitation information, the subscriber information, the non-subscriber information and the messaging group information.

The storing unit 350 may store the invitation information created by the invitation information creating unit 320. According to an embodiment, the storing unit 350 may store the invitation information, inviter information, and non-subscriber information in relation to one another. According to an embodiment, the server 300 may store invitation information, subscriber information, non-subscriber information and messaging group information in relation to one another.

According to an embodiment, the storing unit 350 may store the messaging service subscriber information or the messaging group. According to an embodiment, the storing unit 350 may store a messaging service ID according to the joining of a non-subscriber.

The controller 360 may control a request of invitation information related to the invitation to the messaging group, a creation of the invitation information, a transmission of the invitation information, and at least one process related to the invitation to the messaging group.

The server 300 according to various embodiments of the present disclosure may include an invitation information creating unit 320 configured to create invitation information when invitation information is requested from an inviter terminal 100, a communication unit 310 configured to transmit the invitation information to the inviter terminal 100 and to transmit a join result of a non-subscriber for a messaging service to the inviter terminal 100, a membership managing unit 330 configured to let a non-subscriber join the messaging service when a join request including the invitation information and non-subscriber information is received from a non-subscriber terminal device 200, and a group managing unit 340 configured to add the non-subscriber to join a messaging group when a request inviting the non-subscriber to the messaging group is received from the inviter terminal 100.

FIGS. 6A to 6F are views showing a display screen provided by an inviter terminal apparatus or a non-subscriber terminal apparatus according to various embodiments of the present disclosure.

Referring to FIGS. 6A, 6B, 6C, 6D and 6F, display screens 135 provided by an inviter terminal device 100 are illustrated. Referring to FIG. 6E, a display screen 235 provided by a non-subscriber terminal device 200 is illustrated.

Figure 6A:
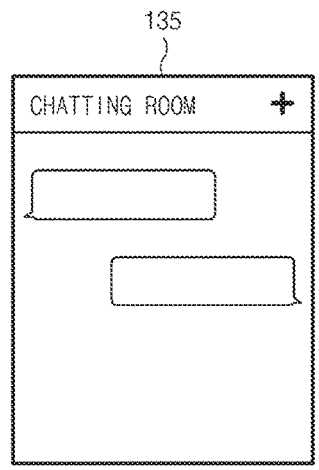
FIGS. 6A, 6B, 6C, 6D, 6E, and 6F are views showing a display screen provided by an inviter terminal device or a non-subscriber terminal device according to various embodiments of the present disclosure.
Figure 6B:
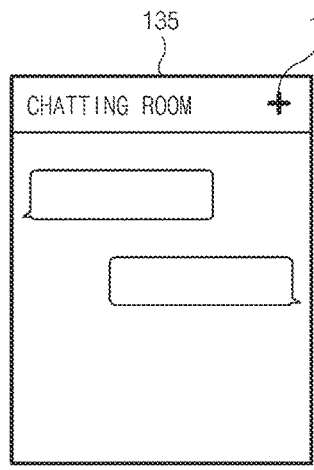

FIG. 6A indicates a display screen 135 displaying contents (e.g., texts, photographs, etc.) transmitted/received within a messaging group (or chatting room) while a messaging application is executed. Referring to FIG. 6B, an icon 10 for adding a user may be displayed on the display screen 135.

Figure 6C:
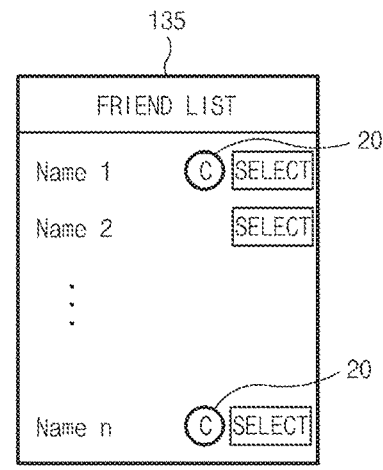

When the icon for adding a user is selected, a friend list may be displayed as shown in FIG. 6C. According to an embodiment, a name of a non-subscriber as well as a messaging service subscriber may be also included in the friend list. According to an embodiment, the messaging service subscriber may be displayed by an icon 20 so as to be distinguished from a non-subscriber as shown in FIG. 6C. The user may select at least one of the subscribers or the non-subscribers included in the friend list.

Figure 6D:
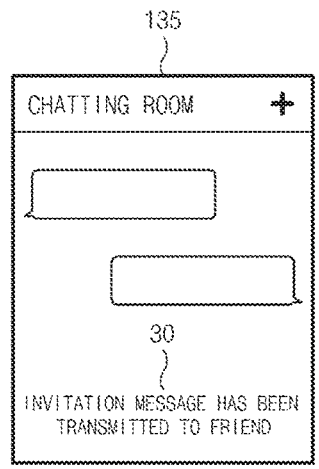
Figure 6E:

When the user selects at least one of the non-subscribers included in the list, the inviter terminal device 100 may transmit an invitation message to the selected non-subscriber terminal device 200. When the invitation message is transmitted, an object 30 indicating that the invitation message has been transmitted may be displayed as shown in FIG. 6D.

Meanwhile, when receiving the invitation message, the non-subscriber terminal device 200 may display the invitation message as shown in FIG. 6E. Referring to FIG. 6E, the invitation message may include an invitation phrase (e.g., "Your friend has sent a ChatON invitation message") and an application installation URL 40. The non-subscriber may select the application installation URL 40 to install the application and then join the messaging service.

Figure 6F:
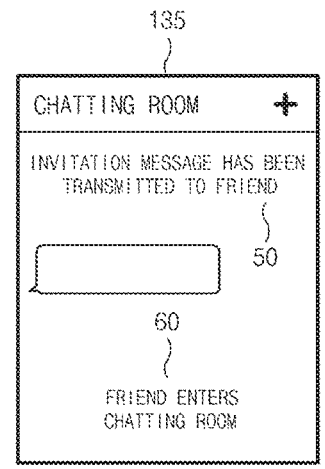

When the non-subscriber joins the messaging service, the non-subscriber may be automatically invited to the messaging group to which the inviter invites. Thus, an object 50 indicating that the non-subscriber has been invited to the messaging group may be displayed and an object 60 indicating that the non-subscriber has entered the chatting room may be displayed as shown in FIG. 6F.

Figure 7:
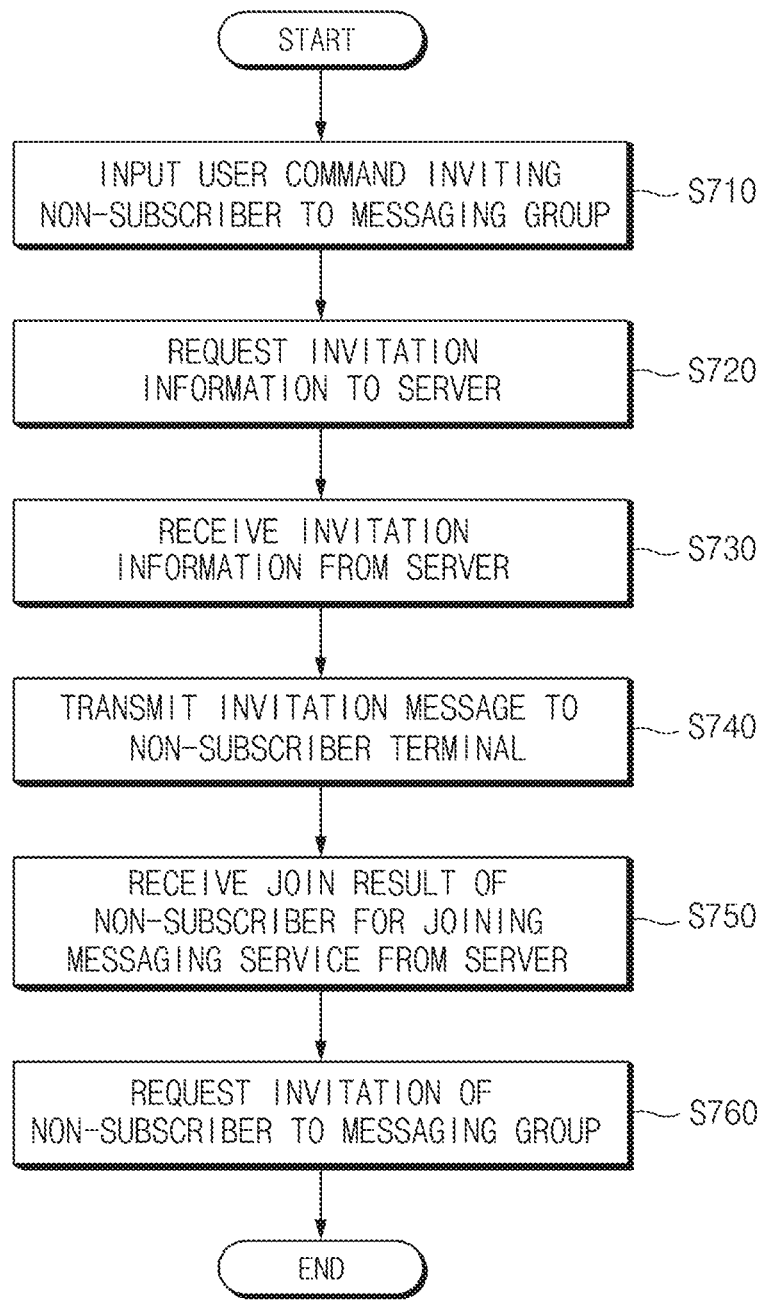
FIG. 7 is a flowchart showing a method of providing a messaging service in an inviter terminal device according to an embodiment of the present disclosure.

FIG. 7 is a flowchart showing a method of providing a messaging service in a server according to an embodiment of the present disclosure.

Referring to FIG. 7, a flowchart consisting of time-series processes processed by an inviter terminal device 100, as shown in FIG. 3, is illustrated. Therefore, although being omitted below, any content related to the inviter terminal device shown in FIG. 3 may be applied to the flowchart shown in FIG. 7.

Referring FIG. 7, the inviter terminal device 100 may receive an input of a user command inviting a non-subscriber of the messaging service from a user thereof at operation S710. According to an embodiment, the inviter terminal device 100 may display a list including messaging service subscribers and non-subscribers. Alternatively, the inviter terminal device 100 may display a list including only non-subscribers of the messaging service in a specific messaging group (e.g., chatting room). In relation to this, the inviter terminal device 100 may provide at least one icon or menu item capable of outputting at least one of a messaging service subscriber list, a messaging service non-subscriber list, and a mixed list (including the messaging service subscriber and the messaging service non-subscribers). The above-described icon or menu item may be outputted from a specific messaging service execution screen (e.g.: a standby room screen or the like according to an execution of the messaging service), a specific messaging group display screen (e.g.: a specific chatting room screen), or a standby screen (e.g.: a screen on which menus or icons provided according to unlocking of a lock screen or the like are disposed or an IDLE screen provided prior to entry into an execution of another function). The user may select at least one of the non-subscribers included in the list.

The inviter terminal device 100 may transmit a request for invitation information to the server 300 at operation S720. According to an embodiment, the inviter terminal device 100 may transmit inviter information and non-subscriber information together when requesting the invitation information. For example, the inviter information may be an inviter's messaging service ID or MSISDN, and the non-subscriber information may be MSISDN.

The inviter terminal device 100 may receive the invitation information from the server at operation S730. When the invitation information is received from the server 300, the inviter terminal device 100 may transmit an invitation message to the non-subscriber terminal device 200 at operation S740. According to an embodiment, the invitation message may include invitation information and an application installation URL. The inviter terminal device 100 may store the application installation URL in advance, or may receive the application installation URL together with the invitation information from the server 300. According to an embodiment, the inviter terminal device 100 may transmit the invitation message by using a messaging service different from the messaging service according to an embodiment of the present disclosure. For example, the inviter terminal device 100 may transmit an invitation message to the non-subscriber terminal device 200 by using a SMS. Alternatively, the inviter terminal device 100 may transmit the invitation message to the non-subscriber terminal device 200 (or an e-mail server device which the non-subscriber terminal device uses) by using an e-mail.

The inviter terminal device 100 may receive a result of the non-subscriber joining the messaging service from the server at operation S750. When the join result of the non-subscriber for the messaging service is received from the server 300, the inviter terminal device 100 may transmit a request for an invitation of the non-subscriber to the messaging group to the server 300 at operation S760. According to an embodiment, the inviter terminal device 100 may request the invitation of the non-subscriber by using the messaging group information and a messaging service ID or MSISDN of the non-subscriber.

According to various embodiments of the present disclosure, a method of providing, by a terminal device, a messaging service may include receiving an input of a user command inviting a non-subscriber of a messaging service to join a messaging group at operation S710, requesting invitation information to a server 300 at operation S720, and when invitation information is received from the server 300 at operation S730, transmitting an invitation message including the invitation information and an application installation URL to a non-subscriber terminal device 200 at operation S740, and when a join result of the non-subscriber for the messaging service is received from the server 300 at operation S750, transmitting a request for an invitation of the non-subscriber to the messaging group at operation S760.

Figure 8:
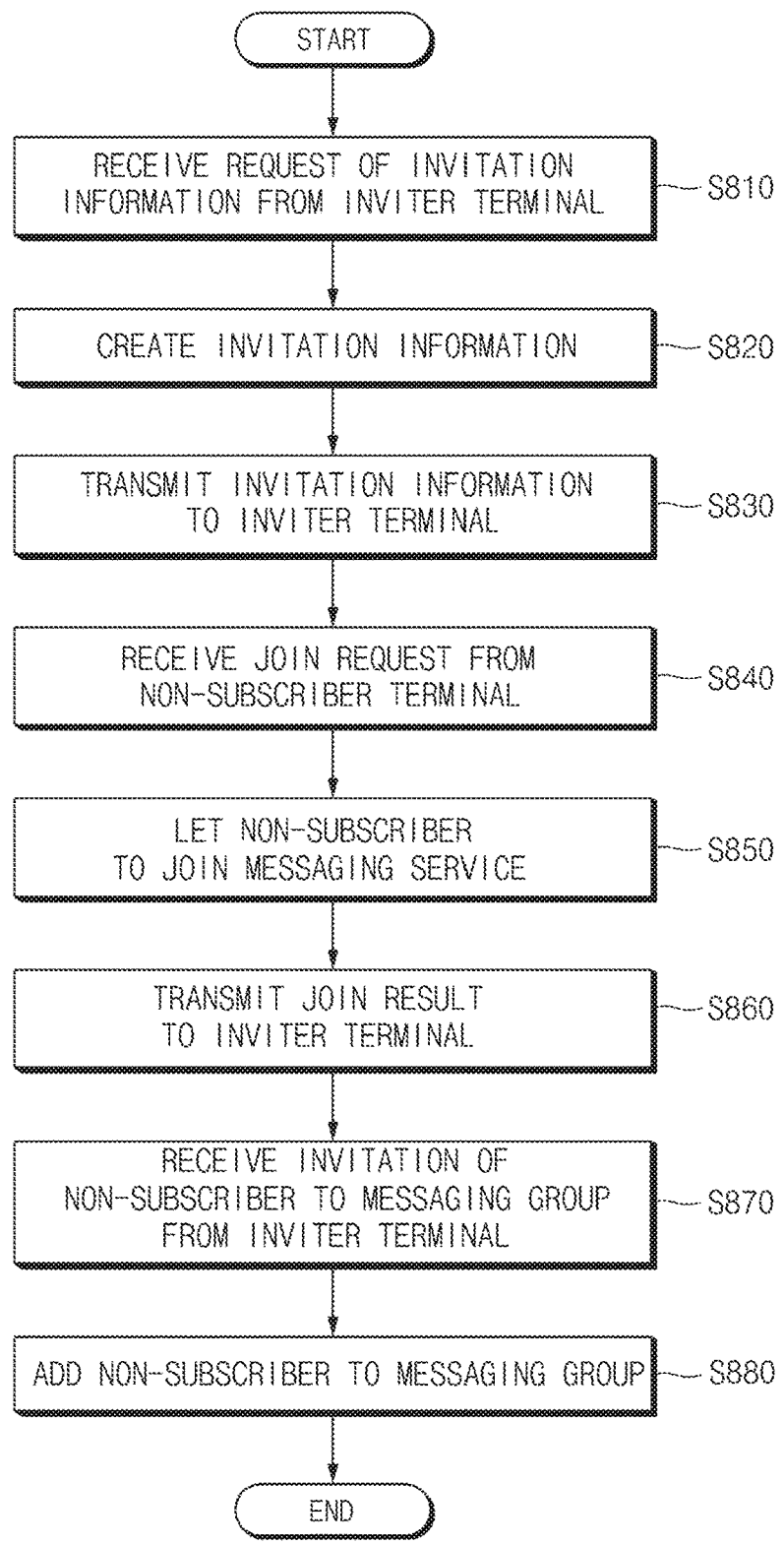
FIG. 8 is a flowchart showing a method of providing a messaging service in a server according to an embodiment of the present disclosure.

FIG. 8 is a flowchart showing a method of providing a messaging service in a server according to an embodiment of the present disclosure.

Referring to FIG. 8, a flowchart consisting of time-series processes processed by a server, as shown in FIG. 5, is illustrated. Therefore, although being omitted below, any content related to the server shown in FIG. 5 may be applied to the flowchart shown in FIG. 8.

Referring to FIG. 8, the server 300 may receive a request of invitation information from the inviter terminal device 100 at operation S810. When the invitation information is requested from the inviter terminal device 100, the server 300 may create the invitation information at operation S820. The invitation information may include inherent identification information by which it may be identified that an inviter has invited a non-subscriber to the messaging group. Whenever the invitation information is requested, the server 300 may create inherent invitation information. According to an embodiment, the server 300 may store the invitation information in relation to the subscriber information and non-subscriber information received from the inviter terminal device 100. According to an embodiment, the server 300 may store invitation information, subscriber information, non-subscriber information and messaging group information in relation to one another.

When the invitation information is created, the server 300 may transmit the created invitation information to the inviter terminal device 100 at operation S830. According to an embodiment, the server 300 may transmit an application installation URL together with the invitation information.

The server 300 may receive a join request from the non-subscriber terminal device 200 at operation S840. When the join request is received from the non-subscriber terminal device 200, the server 300 may let the non-subscriber join the messaging group at operation S850. According to an embodiment, when the non-subscriber joins the messaging service, the server 300 may store the messaging service ID of the non-subscriber.

When the non-subscriber joins the messaging service, the server 300 may transmit the join result to the inviter terminal device 100 at operation S860. According to an embodiment, the server 300 may identify the inviter by using the invitation information received together with the join request from the non-subscriber terminal device 200, and may transmit the join result to the identified inviter. According to an embodiment, when transmitting the join result, the server 300 may transmit the messaging service ID of the non-subscriber together.

When a request inviting a non-subscriber to the messaging group is received from the inviter terminal device 100 at operation S870, the server 300 may add the non-subscriber to the messaging group at operation S880.

The above embodiment describes that when a non-subscriber joins the messaging service, the server 300 transmits a join result to the inviter terminal device 100. However, according to an embodiment, in a case where the server 300 stores the invitation information, the subscriber information, the non-subscriber information and the messaging group information in relation to one another, the server 300 may not transmit the join result to the inviter terminal device 100. According to an embodiment, in a case where the server 300 stores the invitation information, the subscriber information, the non-subscriber information and the messaging group information in relation to one another, when a non-subscriber joins the messaging service, the server 300 may add the non-subscriber to the messaging group using the invitation information, the subscriber information, the non-subscriber information and the messaging group information.

A method of providing, by a server, a messaging service according to various embodiments of the present disclosure may include creating invitation information at operation S820 when the invitation information is requested from an inviter terminal 100 at operation S810, transmitting the invitation information to the inviter terminal 100 at operation S830, an operation of, when a join request including the invitation information and non-subscriber information is received from a non-subscriber terminal device 200 at operation S840, letting the non-subscriber join the messaging service at operation S850, transmitting the join result to the inviter terminal 100 at operation S860, and an operation of, when a request inviting the non-subscriber to the messaging group is received from the inviter terminal 100 at operation S870, adding the non-subscriber to the messaging group at operation S880.

The above-described method of providing, by an inviter terminal device 100 or a server 300, the messaging service may be implemented in programs that may be executed on the terminal device 100 or the server 300. These programs may be stored and used in various types of recording mediums.

In particular, program codes for performing the above-described methods may be stored in various types of non-volatile recording mediums such as a flash memory, a Read Only Memory (ROM), an Erasable and Programmable ROM (EPROM), an Electrically Erasable and Programmable ROM (EEPROM), a hard disk, a removable disk, a memory card, an USB memory, and a CD-ROM.

According to various embodiments of the present disclosure, it is possible to induce a service join of users who do not join a messaging service and to extend the messaging service.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A portable communication device comprising:
a display;
a communication circuitry; and
a processor configured to:
present, via the display, a user interface corresponding to a first messaging service, control the communication circuitry to transmit, to a server, a request for invitation information with respect to a messaging group corresponding to the first messaging service based at least in part on a user input received via the user interface, in response to transmitting the request, control the communication circuitry to receive the invitation information from the server, and when the invitation information is received from the server, control the communication circuitry to transmit at least part of the invitation information to an external electronic device via a second messaging service, the external electronic device being external to the portable communication device.

2. The portable communication device of claim 1, wherein the processor is further configured to provide, as at least part of the presenting of the user interface, contact information corresponding to the external electronic device.

3. The portable communication device of claim 2, wherein the processor is further configured to perform the transmitting of the at least part of the invitation information using the contact information.

4. The portable communication device of claim 1, wherein the processor is further configured to identify the external electronic device based at least in part on a determination that a user corresponding to the external electronic device is a non-subscriber to the first messaging service.

5. The portable communication device of claim 1, wherein the processor is further configured to identify the messaging group based at least in part on a determination that a user corresponding to the portable communication device is a member of the messaging group.

6. The portable communication device of claim 1, wherein the processor is further configured to control the communication circuitry to receive, as at least part of the invitation information, a link to the messaging group.

7. The portable communication device of claim 6, wherein the processor is further configured to control the communication circuitry to transmit, as the at least part of the invitation information, the link to the external electronic device such that the messaging group is to be accessed at the external electronic device using the link.

8. The portable communication device of claim 7, wherein the processor is further configured to control the communication circuitry to transmit, as the at least part of the invitation information, the link to the external electronic device such that an application installation file is to be accessed at the external electronic device using the link.

9. The portable communication device of claim 1, wherein the communication circuitry comprises a first communication circuitry and a second communication circuitry, the first communication circuitry being configured to establish a first communication connection corresponding to a first communication network, and the second communication circuitry being configured to establish a second communication connection corresponding to a second communication network, and wherein the processor is further configured to:

perform the transmitting of the request to the server via the first communication connection established using the first communication circuitry; and perform the transmitting of the at least part of the invitation information to the external electronic device via the second communication connection established using the second communication circuitry.

10. The portable communication device of claim 1,
wherein the second messaging service includes a short message service, and
wherein the processor is further configured to perform the transmitting of the at least part of the invitation information to the external electronic device using the short message service.

11. A server comprising:
a communication circuitry; and
a processor configured to:
control the communication circuitry to receive a request for invitation information with respect to a messaging group corresponding to a first messaging service from a first electronic device that is external to the server, in response to receiving the request, generate the invitation information including a link to the messaging group, and when the invitation information including the link is generated, control the communication circuitry to transmit the invitation information including the link to the first electronic device such that at least part of the invitation information including the link is to be transmitted from the first electronic device to a second electronic device external to the server via a second messaging service established between the first electronic device and the second electronic device.

12. The server of claim 11, wherein the processor is further configured to control the communication circuitry to transmit, as the at least part of the invitation information, the link to the first electronic device such that an application installation file corresponding to the first messaging service is to be accessed using the link.

13. The server of claim 11, wherein the processor is further configured to identify the second electronic device based at least in part on a determination that a user corresponding to the second electronic device is a non-subscriber to the first messaging service.

14. The server of claim 13, wherein the processor is further configured to in response to receiving another request generated by the second electronic device using at least part of the invitation information, register the user corresponding to the second electronic device as a member of the messaging group.

15. The server of claim 13, wherein the processor is further configured to control the communication circuitry to transmit, to the first electronic device, an indication indicating that the user corresponding to the second electronic device has joined the messaging group.

16. A non-transitory machine-readable storage device storing instructions that, when executed by one or more processors, cause the one or more processors to perform operations comprising:

presenting, at an electronic device, a user interface corresponding to a first messaging service;

transmitting, to a server, a request for invitation information with respect to a messaging group corresponding to the first messaging service based at least in part on a user input received via the user interface;

in response to transmitting the request, receiving the invitation information from the server; and when the invitation information is received from the server, transmitting at least part of the invitation information to an external electronic device via a second messaging service, the external electronic device being external to the non-transitory machine-readable storage device.

17. The non-transitory machine-readable storage device of claim 16, wherein the presenting of the user interface comprises providing contact information corresponding to the external electronic device and the second messaging service.

18. The non-transitory machine-readable storage device of claim 16, wherein the receiving of the invitation information from the server comprises receiving a link to the messaging group as the at least part of the invitation information.

19. The non-transitory machine-readable storage device of claim 18, wherein the transmitting of the at least part of invitation information comprises transmitting the link to the external electronic device such that the messaging group is to be accessed at the external electronic device using the link.

20. The non-transitory machine-readable storage device of claim 19, wherein the transmitting of the at least part of the invitation information further comprises transmitting the link to the external electronic device such that an application installation file corresponding to the first messaging service can be accessed at the external electronic device using the link.

* * * * *